(12) United States Patent
Bhogal et al.

(10) Patent No.: US 8,346,878 B2
(45) Date of Patent: Jan. 1, 2013

(54) FLAGGING RESOURCE POINTERS DEPENDING ON USER ENVIRONMENT

(75) Inventors: Kulvir S. Bhogal, Pflugerville, TX (US); Lisa Seacat DeLuca, San Francisco, CA (US); Robert R. Peterson, Austin, TX (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/614,078

(22) Filed: Nov. 6, 2009

(65) Prior Publication Data

US 2011/0113104 A1    May 12, 2011

(51) Int. Cl.
*G06F 15/16* (2006.01)
(52) U.S. Cl. ...................................................... 709/206
(58) Field of Classification Search .................... 709/206
See application file for complete search history.

(56) References Cited

U.S. PATENT DOCUMENTS

| | | | |
|---|---|---|---|
| 6,615,242 B1 * | 9/2003 | Riemers ........................ | 709/206 |
| 7,299,263 B2 * | 11/2007 | Claudatos et al. ............ | 709/206 |
| 7,363,489 B2 | 4/2008 | Burakoff et al. | |
| 7,966,400 B2 * | 6/2011 | Brown et al. .................. | 709/225 |
| 2002/0013692 A1 * | 1/2002 | Chandhok et al. ............... | 704/1 |
| 2004/0169685 A1 | 9/2004 | Kubala | |
| 2005/0060384 A1 | 3/2005 | Keohane et al. | |
| 2005/0071776 A1 | 3/2005 | Mansfield et al. | |
| 2005/0108350 A1 | 5/2005 | Dietz et al. | |
| 2005/0251736 A1 | 11/2005 | Ran et al. | |
| 2006/0155707 A1 | 7/2006 | Marcjan | |
| 2006/0168056 A1 * | 7/2006 | Gandhi et al. ................. | 709/206 |
| 2006/0253771 A1 | 11/2006 | Baschy | |
| 2007/0161382 A1 * | 7/2007 | Melinger et al. ........... | 455/456.1 |
| 2008/0172220 A1 | 7/2008 | Ohshima | |
| 2008/0172738 A1 | 7/2008 | Bates et al. | |
| 2009/0012965 A1 * | 1/2009 | Franken ........................ | 707/10 |

OTHER PUBLICATIONS

Robert J. Schloss, Novel Business Uses of Independently Created Hyperlinks in the World Wide Web: Basic Mechanism and Examples, Proceedings of the 29th Annual Hawaii International Conference on System Sciences, Jan. 3-6, 1996, Wailea, HI, USA, vol. 2, pp. 137-146.

Wen-Kui Chang, Shing-Kai Hon and Cheng-Chung William Chu, A Systematic Framework for Evaluating Hyperlink Validity in Web Environments, Proceedings of the Third International Conference on Quality Software (QSIC'03), Nov. 6-7, 2003, Dallas, TX, USA, pp. 178-185.

(Continued)

*Primary Examiner* — John Macilwinen
(74) *Attorney, Agent, or Firm* — Patterson & Sheridan, LLP (57) ABSTRACT

Techniques are disclosed for indicating a hyperlink in a message as being inappropriate for a specified user environment, such as an office or an educational setting. In one embodiment, a message may be received from a sending user and to a receiving user (e.g., by a sending mail client or by a mail server). The message may include a hyperlink. If a message includes a hyperlink determined to be inappropriate for the specified user environment, a property of the message may be set to indicate as such. Optionally, the sending user may be notified that the hyperlink is indicated as being inappropriate for the specified user environment. The receiving user may also be warned not to activate the hyperlink that is determined to be inappropriate.

24 Claims, 5 Drawing Sheets

OTHER PUBLICATIONS

Huaxiang Zhang and Jing Lu, A Fuzzy Approach to Ranking Hyperlinks, Fourth International Conference on Fuzzy Systems and Knowledge Discovery (FSKD 2007), Aug. 24-27, 2007, Haikou, China, vol. 3, pp. 406-410.

Julie S. Downs, Mandy B. Holbrook and Lorrie Faith Cranor, Decision Strategies and Susceptibility to Phishing, Symposium on Usable Privacy and Security (SOUPS), Jul. 12-14, 2006, Pittsburgh, PA, USA, vol. 149, pp. 79-90.

"US Passes Misleading Hyperlink Law," WebProNews (Jul. 26, 2006), 2 pages. Retrieved on Apr. 8, 2010 from http://www.webpronews.com/node/30740/print.

* cited by examiner

FLAGGING RESOURCE POINTERS DEPENDING ON USER ENVIRONMENT

BACKGROUND

1. Field

Embodiments of the invention relate to exchanging messages between users over a computer communications network. More specifically, embodiments of the invention relate to techniques for flagging hyperlinks as being inappropriate for an office environment.

2. Description of the Related Art

Many messages are exchanged today between users over computer communications networks. Some examples of messages include electronic mail, instant messaging (IM), and Short Message Service (SMS), i.e., text messaging. In particular, electronic mail (email) is a widespread form of communication. Typically, emails are composed and sent using a mail client application. A given email message may include payload in the form of text or in-line figures, as well as attachments (e.g., documents, pictures, video files). Further, the email message may include hyperlinks. As is known, a hyperlink is a reference from one document (e.g., the email message) to another (e.g., a web page). Generally, a hyperlink facilitates content browsing. Content browsing refers to the retrieval and presentation of electronic content via a client application, such as a Web browser. Generally, content may include electronic documents, graphical images, audio, and audiovisual and video materials. Typically, content may be stored in a server environment and published for access by content consumers over a computer communications network such as the Internet. Content consumers, in turn, can retrieve content over the network by reference to a network address for the content. Once retrieved, the content may be rendered by the client application.

An example of a hyperlink is a Uniform Resource Identifier. As is known, a Uniform Resource Identifier (URI) is a string of characters used to identify or name a resource on a network, such as the Internet. A common way to identify a piece of content available on a computer network such as the Internet is through an addressing scheme including a protocol identifier such as "http", a physical server address such as "domain.tld," a file system address such as "root/sub-level" and a file name such as "mypage.html" such that the combined URI appears as "http://domain.tld/root/sub-level/mypage.html" (referring to the electronic document "mypage.html"). Further, many pieces of content included in a Web page, such as graphical images, may each be associated with and retrieved through a respective URI.

Activating a hyperlink in content in a content browser generally causes content referenced by the hyperlink to be retrieved and displayed in the client application. In some circumstances, activating the hyperlink can result in launching a new client application (e.g., a word processor application) that can display or otherwise render the referenced content. Of note, hyperlinked content is not limited to textual content. For instance, hyperlinked content may include multimedia elements or even files selected for download. Further, some advanced Web applications utilize hyperlinks to initiate commands in a backend computing system such as initiation of a database query or submission of a form.

SUMMARY

One embodiment of the invention includes a computer-implemented method. The method may generally include configuring one or more computer processors to perform an operation for evaluating a hyperlink included in a message. The operation may generally include receiving the message from a first user, wherein the message is addressed to a second user and includes the hyperlink; determining that the hyperlink is inappropriate for a specified user environment; setting a property of the message to indicate that the hyperlink is determined to be inappropriate for the specified user environment; and sending the message to the second user.

Another embodiment of the invention includes a computer-readable storage medium containing a program, which, when executed on a processor, performs an operation for evaluating a hyperlink included in a message. The operation may generally include receiving the message from a first user, wherein the message is addressed to a second user and includes the hyperlink; determining that the hyperlink is inappropriate for a specified user environment; setting a property of the message to indicate that the hyperlink is determined to be inappropriate for the specified user environment; and sending the message to the second user.

Still another embodiment includes a system having one or more computer processors and a memory containing a program, which when executed by the one or more computer processors is configured to perform an operation for evaluating a hyperlink included in a message. The operation may generally include receiving the message from a first user, wherein the message is addressed to a second user and includes the hyperlink; determining that the hyperlink is inappropriate for a specified user environment; setting a property of the message to indicate that the hyperlink is determined to be inappropriate for the specified user environment; and sending the message to the second user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for flagging a hyperlink as being inappropriate for a particular user environment, e.g., an office environment. One embodiment of the invention provides a mail server application—or a plug-in component that operates in conjunction with a mail server application. As is known, a mail server provides a software application for routing and delivering emails. In one embodiment, the (mail server) application may receive an email from a sending user addressed to a receiving user. The application may analyze the hyperlink and/or content retrieved using the hyperlink to determine whether the hyperlink is appropriate for the particular user environment. If the application determines that the content accessible through the hyperlink (or the content of the hyperlink itself) is inappropriate, then the server application may flag the hyperlink as being inappropriate. The application may also notify the sending user that the hyperlink is flagged as being inappropriate. Accordingly, the sending user may learn to not send links of similar nature (and/or from the same website) to the receiving user in the particular user environment. Further, if a hyperlink is flagged, an email reader application of the receiving user may notify the receiving user that the hyperlink may be inappropriate for the office environment. Accordingly, the receiving user may refrain from activating any hyperlink determined to be inappropriate for the given user environment.

While embodiments herein are described with reference to flagging hyperlinks in emails, those skilled in the art will recognize that embodiments of the invention may be adapted to support any messages exchanged over computer communications networks (e.g., instant messaging).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
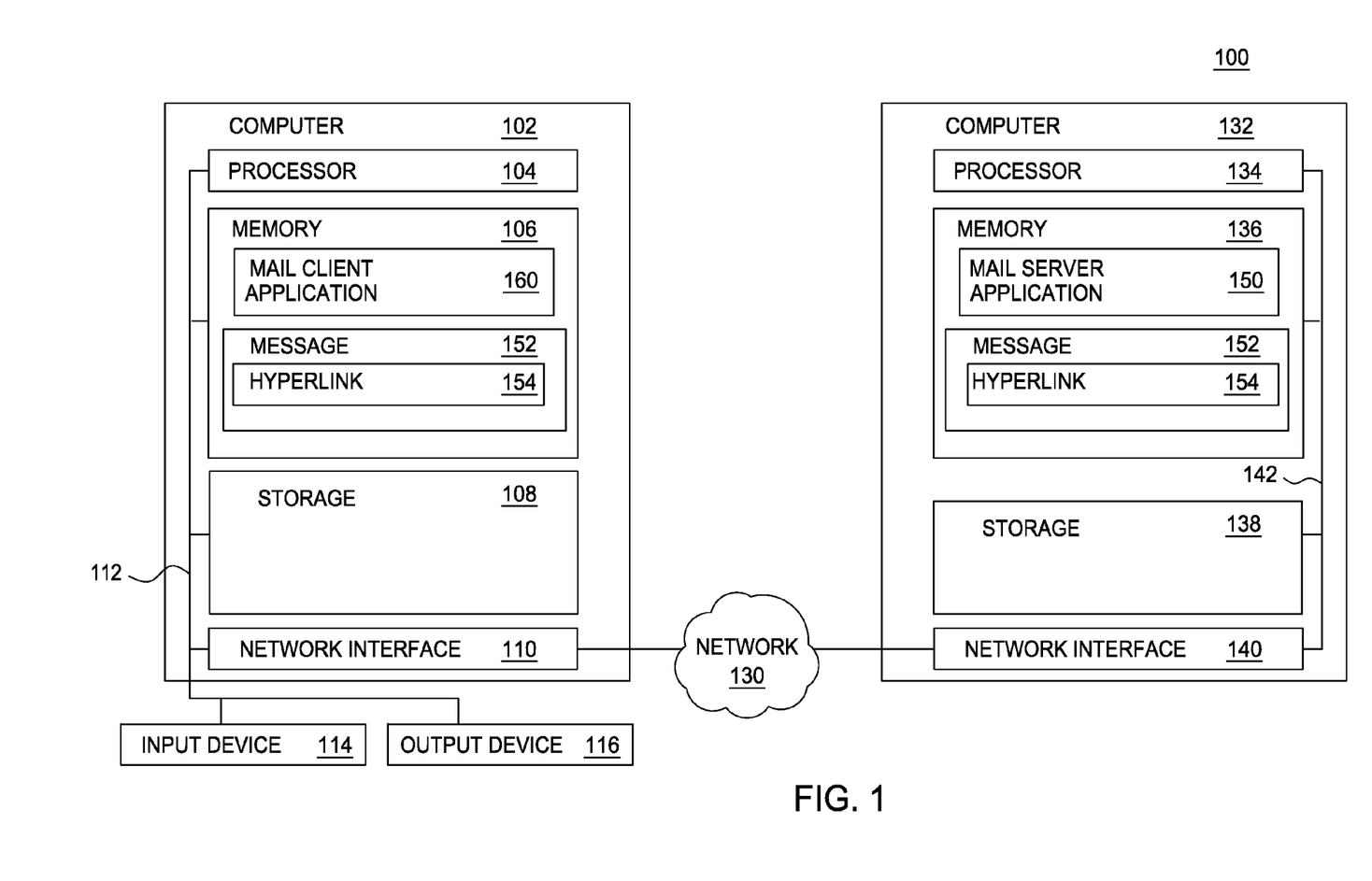
FIG. 1 is a block diagram illustrating a system for flagging hyperlinks that are inappropriate for an office environment, according to one embodiment of the invention.

FIG. 1 is a block diagram illustrating a system 100 for flagging hyperlinks that are inappropriate for an office environment, according to one embodiment of the invention. The system 100 includes a two computer systems 102, 132 which include a client and a server. The computer systems 102, 132 may be connected to each other (and to other computers) via a network 130. In general, the network 130 may be a telecommunications network and/or a wide area network (WAN). In a particular embodiment, the network 130 is the Internet.

Each of the computer systems 102, 132 generally include a processor 104, 134 connected via a bus 112, 142 to a memory 106, 136, a network interface device 110, 140, and a storage 108, 138. The computer system 102 is further connected to an input device 114 and an output device 116. Each of the computer systems 102, 132 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. Each processor 104, 134 is included to be representative of a single CPU, multiple CPUs, a single CPU having multiple processing cores, and the like. Similarly, each memory 106, 136 may be a random access memory. While the memory 106, 136 is shown as a single entity, it should be understood that the memory 106, 136 may comprise a plurality of modules, and that the memory 106, 136 may exist at multiple levels, from high speed registers and caches to lower speed but larger DRAM chips. Each network interface device 110, 140 may be any type of network communications device allowing the computer system 102, 132 to communicate with each other (and/or other computers) via the network 130.

Each storage 108, 138 may be a hard disk drive storage device. Although the storage 108, 138 is shown as a single unit, the storage 108, 138 may be a combination of fixed and/or removable storage devices, such as fixed disc drives, floppy disc drives, tape drives, removable memory cards, or optical storage. The memory 106, 136 and the storage 108, 138 may be part of one virtual address space spanning multiple primary and secondary storage devices.

The input device 114 may be any device for providing input to the computer system 102. For example, a keyboard, keypad, light pen, touch-screen, track-ball, or speech recognition unit, audio/video player, and the like may be used. The output device 116 may be any device for providing output to a user of the computer system 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer system 102 includes a mail client application 160 and a message 152. The message 152 includes a hyperlink 154. Further, the message 152 may be from a sending user and to a receiving user. The memory 136 of the computer system 132 includes a mail server application 150. In one embodiment, the mail client application 160 may transmit the message 152 to the mail server application 150. In response, the server application 150 may evaluate the hyperlink 154 to determine whether the hyperlink 154 is appropriate for a particular user environment.

Of course, those skilled in the art will recognize that which component(s) of the networked system 100 evaluates the hyperlink 154 may be tailored to suit the needs of a particular case. For example, the mail client application 160 sending the message 152, rather than the mail server application 150, may evaluate the hyperlink 154. More specifically, the hyperlink 154 may be evaluated, without limitation, by a mail transfer agent, a mail user agent, a mail delivery agent, or an instant messaging (IM) server. As is known, a mail transfer agent (MTA) provides a software application configured to transfer email messages from one computer to another computer. That is, the MTA provides a mail server for a group of users. Further, a mail user agent (MUA) provides a software application that allows a user to compose, send, receive, and view email messages. Further still, a mail delivery agent (MDA) is a software application that delivers email messages from an MTA to a mailbox of a user.

Figure 2A:
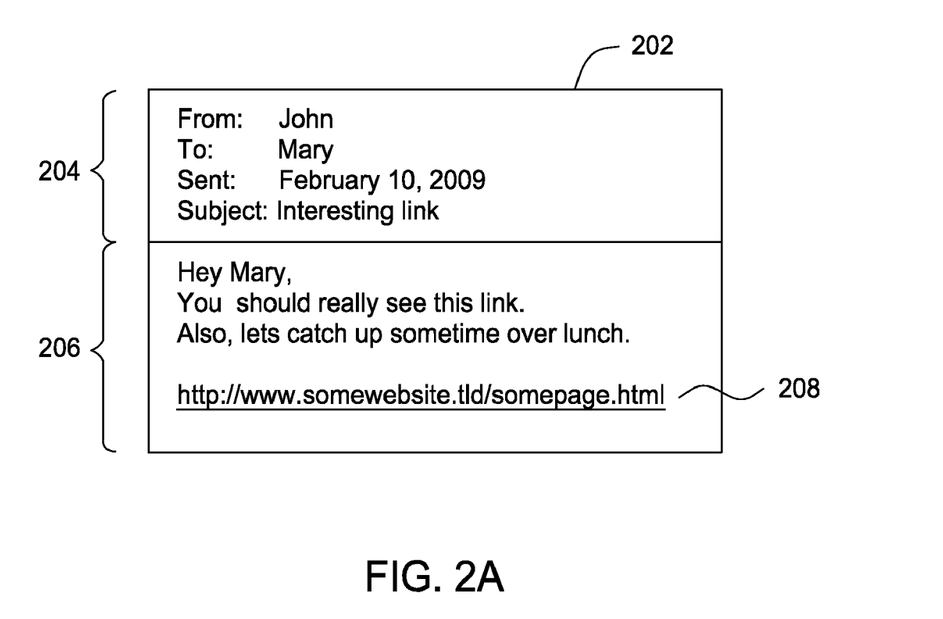
FIG. 2A illustrates an example of a message from a sending user to a receiving user, according to one embodiment of the invention.

In one embodiment, the application 150 receives a message 152 from a sending user (e.g., via the mail client application 160) and that is addressed to a receiving user (i.e., an intended recipient of the message 152). FIG. 2A illustrates an example email message 202, according to one embodiment of the invention. As shown, the message 202 includes properties 204 (also referred to as email message "headers") and a message body 206. The properties 204 indicate that the message is from John to Mary. Further, the properties 204 indicate that the message is sent (by John) on Feb. 10, 2009. Further still, the properties 204 indicate that a subject of the message is "Interesting link." The message body 206 includes, "Hey Mary, You should really see this link. Also, let's catch up sometime over lunch." Further, the message body 206 includes a hyperlink 208. As shown, the hyperlink is "http://www.somewebsite.tld/somepage.html."

In one embodiment, the application 150 determines whether the hyperlink 208 is appropriate for a particular user environment. For example, the application 150 may compute a score for the hyperlink 208 based on keywords in the hyperlink 208, keywords included in content retrieved using the hyperlink 208, and/or a predefined list of hyperlinks (or websites) that are inappropriate for the particular user environment, e.g., an office or educational environment. The score may also be computed based on (or by) a third party application for filtering (i.e., restricting access to) content. If the score exceeds a predefined threshold value, the application 150 may determine that the hyperlink 208 is inappropriate for the particular user environment.

In one embodiment, the application 150 may evaluate content retrieved using the hyperlink 208 against a predefined dictionary of offensive terms to compute a "sensitivity score" for the hyperlink 208. The sensitivity score may represent the frequency with which the offensive terms appear in the retrieved content. The application 150 may also identify words in the retrieved content that may be representative of the nature of the retrieved content (e.g., a title or heading of a document, "tags" representing subject matter of a document, etc.). The application 150 may then weight the identified words more heavily (relative to other words of the retrieved content) in computing the score.

In one embodiment, if the application 150 determines that the hyperlink 208 is inappropriate for the user environment, the application 150 flags the hyperlink 208 as such (i.e., as being inappropriate for an office or other user environment). Specifically, the application 150 may set a property of the message 202 to indicate that the message 202 contains the hyperlink that is determined to be inappropriate for the user environment. For example, the application 150 may modify the message to include a Multipurpose Internet Mail Extensions (MIME) header. As is known, MIME refers to an Internet standard that defines a mechanism for sending specific types of information (e.g., non-ASCII text, non-text attachments, etc.) via email. Table I—shows examples of MIME headers for the message 202:

Table I—MIME Headers For the Message 202
MIME-Version: 1.0
Content-Type: text/html
Hyperlink-Office-Sensitive: 0:TRUE
As shown, the MIME headers for the message 202 include a MIME-Version header and a Content-Type header. The MIME-Version header indicates that the message is MIME-formatted. The Content-Type header indicates that the Internet media type of the email is "text/html." In one embodiment, the application 150 may add a Hyperlink-Office-Sensitive header to the message 202. The Hyperlink-Office-Sensitive header may include a distinct identifier for each hyperlink in the email. The Hyperlink-Office-Sensitive header may also include a flag for the identifier. The flag indicates whether the hyperlink associated with the identifier is determined to be inappropriate for an office environment. For example, header of "0:TRUE" indicates that a first hyperlink in the email is flagged as being inappropriate for a given user environment.

As another example, suppose that the message 202 includes two additional hyperlinks (i.e., for a total of three hyperlinks). In such a case, a Hyperlink-Office-Sensitive header of "0:TRUE;1:FALSE;2:FALSE" indicates that the first hyperlink is flagged as inappropriate while the second and third hyperlinks are not flagged as inappropriate. The application 150 may assign identifiers to hyperlinks in an increasing numerical order, based on an order in which the hyperlinks appear in the containing message 202, according to one embodiment. Of course, those skilled in the art will recognize that the way of referencing a hyperlink or storing a flag for the hyperlink in a message may be tailored to suit the needs of a particular case.

Figure 2B:
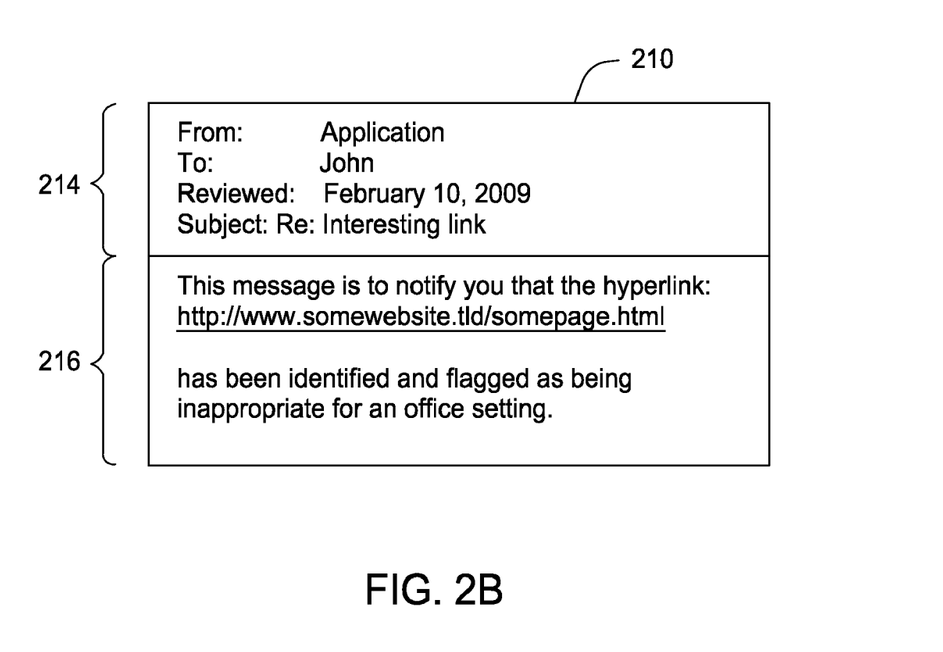
FIG. 2B illustrates an example of a message for notifying the sending user, according to one embodiment of the invention.

In one embodiment, the application 150 may also notify the sending user that the hyperlink 208 is flagged as being inappropriate for an office environment. For example, the application 150 may send a message notifying John the hyperlink 208 is flagged. FIG. 2B illustrates an example of a message 210 for notifying the sending user, according to one embodiment of the invention. As shown, the message 210 includes properties 214 and a message body 216. The properties 214 indicate that the message 210 is from the application 150 to John. Further, the properties 214 indicate that the message is received (by John) on Feb. 10, 2009. Further still, the properties 214 indicate that a subject of the message 210 is "Re: Interesting link."

As shown, the message body 216 includes, "This message is to notify you that the hyperlink: http://www.someweb-site.tld/somepage.html has been identified and flagged as being inappropriate for an office setting." Thus, the application 150 notifies the sending user (via the message 210) that the hyperlink 208 has been flagged as being inappropriate for a given user environment—informing the message sender that a link (or content accessible using the link) may include content deemed by the application 150.

In one embodiment, a message recipient may also be notified about inappropriate content in a URL included in an email message. Suppose for example that the message 218 is delivered to Mary, and Mary reads the message 218 using a mail client application. In such a case, Mary may retrieve content using the hyperlink 208. For example, Mary may click on the hyperlink 208 in the message 218. Suppose also that the mail client application 160 is configured to recognize the flags set by the application 150 (e.g., the "Hyperlink-Office-Sensitive" MIME header). In such a case, the mail client application 160 may notify Mary that the hyperlink 208 is flagged as being inappropriate for a given user environment.

Figure 2C:
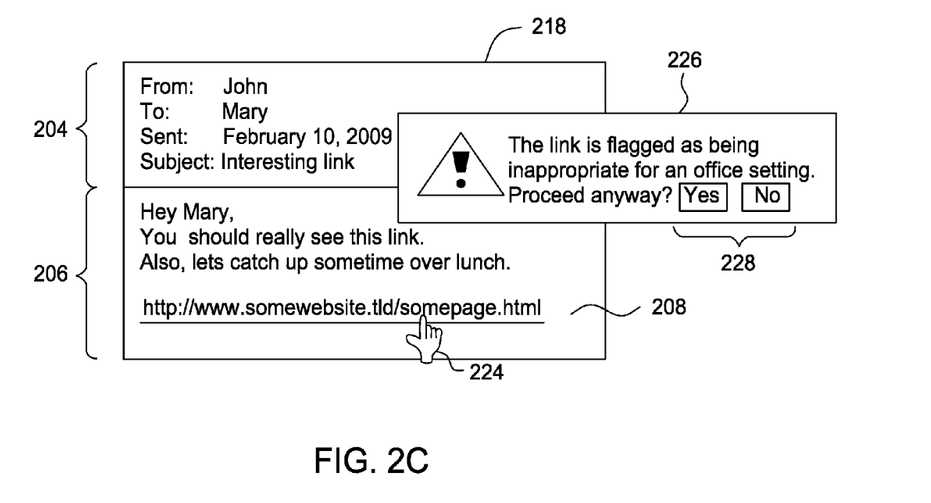
FIG. 2C illustrates a graphical user interface (GUI) for the mail client application for the receiving user as the receiving user is reading the message, according to one embodiment of the invention.

FIG. 2C illustrates a graphical user interface (GUI) 218 presented to the receiving user while viewing message 202, according to one embodiment of the invention. As shown, the GUI 218 displays the message 202 received from John (i.e., the properties 204 and the message body 206). Suppose that Mary clicks on the hyperlink 208 using the cursor 224. In response, the mail client application 160 may display a pop-up 226 alerting Mary that the link has been flagged as being inappropriate for an office setting. In one embodiment, the pop-up 226 may also prompt Mary to specify (e.g., via buttons 228 included in the pop-up 226) whether to proceed to retrieve content using the hyperlink 208 despite the flag.

Figure 2D:
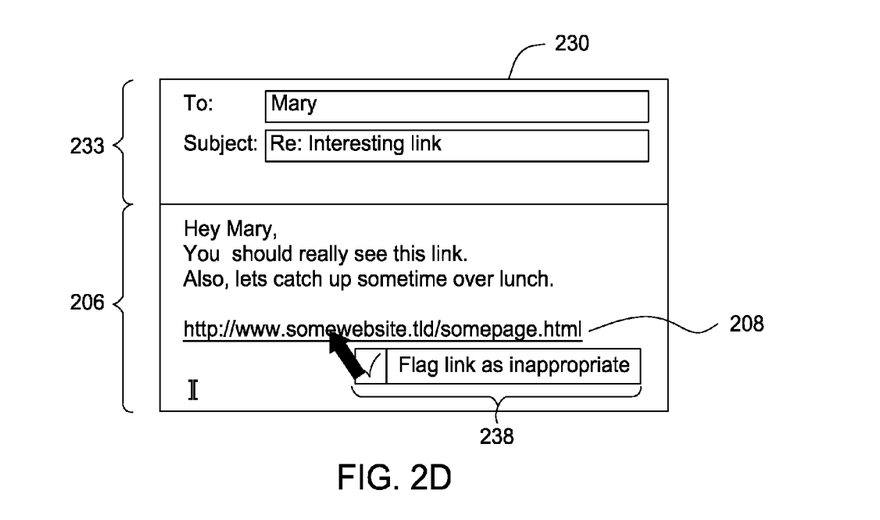
FIG. 2D illustrates a GUI for a mail client application for the sending user as the sending user is composing the message, according to one embodiment of the invention.

In one embodiment, before sending the message 202 to the receiving user, the sending user (i.e., John) may flag the hyperlink 208 as being inappropriate for an office setting. FIG. 2D illustrates a GUI 230 for a mail client application 160 for the sending user as the sending user is composing the message 202, according to one embodiment of the invention. As shown, the GUI 230 includes properties 232 and the message body 206. The properties 232 indicate that the message is to be sent to Mary. Further, the properties 232 indicate that the subject of the message is "Interesting link." The message body 206 includes the link 208.

In one embodiment, John may specify for the hyperlink 208 to be flagged as being inappropriate for a given-user setting. For example, John may right-click on the hyperlink 208 using the cursor 236 to cause a context menu 238 to be displayed for the hyperlink 208. The context menu 238 may include an option to toggle the flag of the hyperlink 208. For example, the context menu 238 may include the option "Flag link as inappropriate." John may click on the option to activate the flag. John may click on the option again to de-active the flag, and so forth. Consequently, John may ensure that the hyperlink 208 is flagged as inappropriate in the message 202 received by Mary (regardless of any subsequent determination by the application 150 of whether the hyperlink 208 is appropriate).

In one embodiment, Mary may wish to override a default behavior of the mail client application 160 that notifies Mary of a hyperlink that is flagged as being inappropriate for a given user environment. For example, the mail client application 160 may receive receiving input from Mary specifying to disregard any indication of a hyperlink as being inappropriate. If Mary requests to retrieve content using the hyperlink that is flagged as inappropriate, the mail client application 160 may retrieve content using the hyperlink without notifying Mary that the hyperlink is indicated as being inappropriate for the specified user environment (i.e., in effect, disregarding any indication of the hyperlink as being inappropriate).

Figure 3:
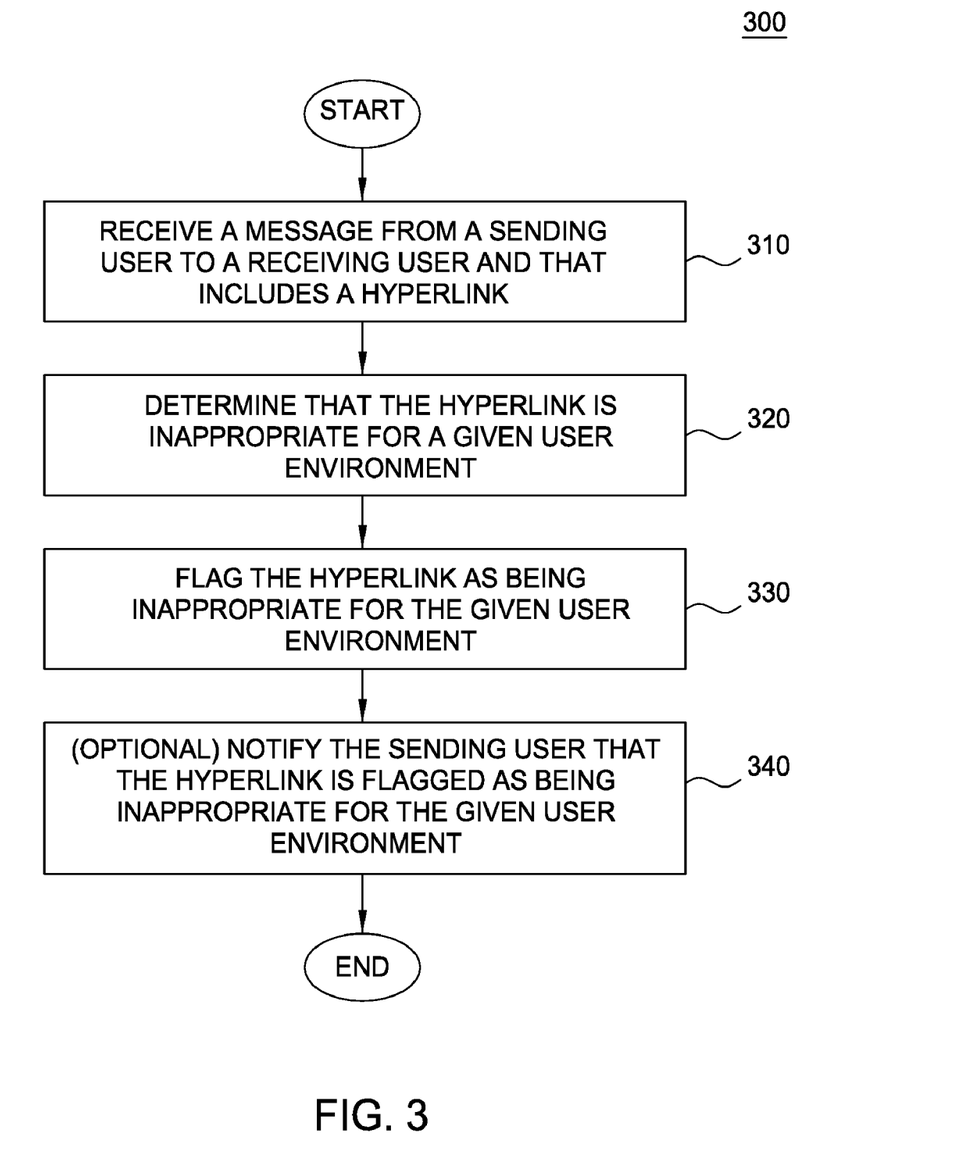
FIG. 3 is a flowchart depicting a method for flagging a hyperlink as being inappropriate for an office environment, according to one embodiment of the invention.

FIG. 3 is a flowchart depicting a method 300 for flagging a hyperlink as being inappropriate for an office environment, according to one embodiment of the invention. As shown, the method 300 begins at step 310, where the application 150 receives a message addressed from a sending user to a receiving user that includes a hyperlink. As noted above, the application 150 may be a mail user agent being used to compose and send the message or a mail server application configured to receive the message from the sender and forward it towards the recipient. At step 320, the application 150 may determine that the hyperlink is inappropriate for a given user environment. For example, the application 150 may compute a score (from the hyperlink and content retrieved using the hyperlink) that exceeds a predefined threshold. At step 330, the application 150 may flag the hyperlink as being inappropriate for an office environment. For example, the application 150 may store the flag and a reference to the hyperlink in a MIME header of the message. At step 340, the application 150 may optionally notify the sending user that the hyperlink is flagged as being inappropriate for the particular user environment. After the step 340, the method 300 terminates.

Figure 4:
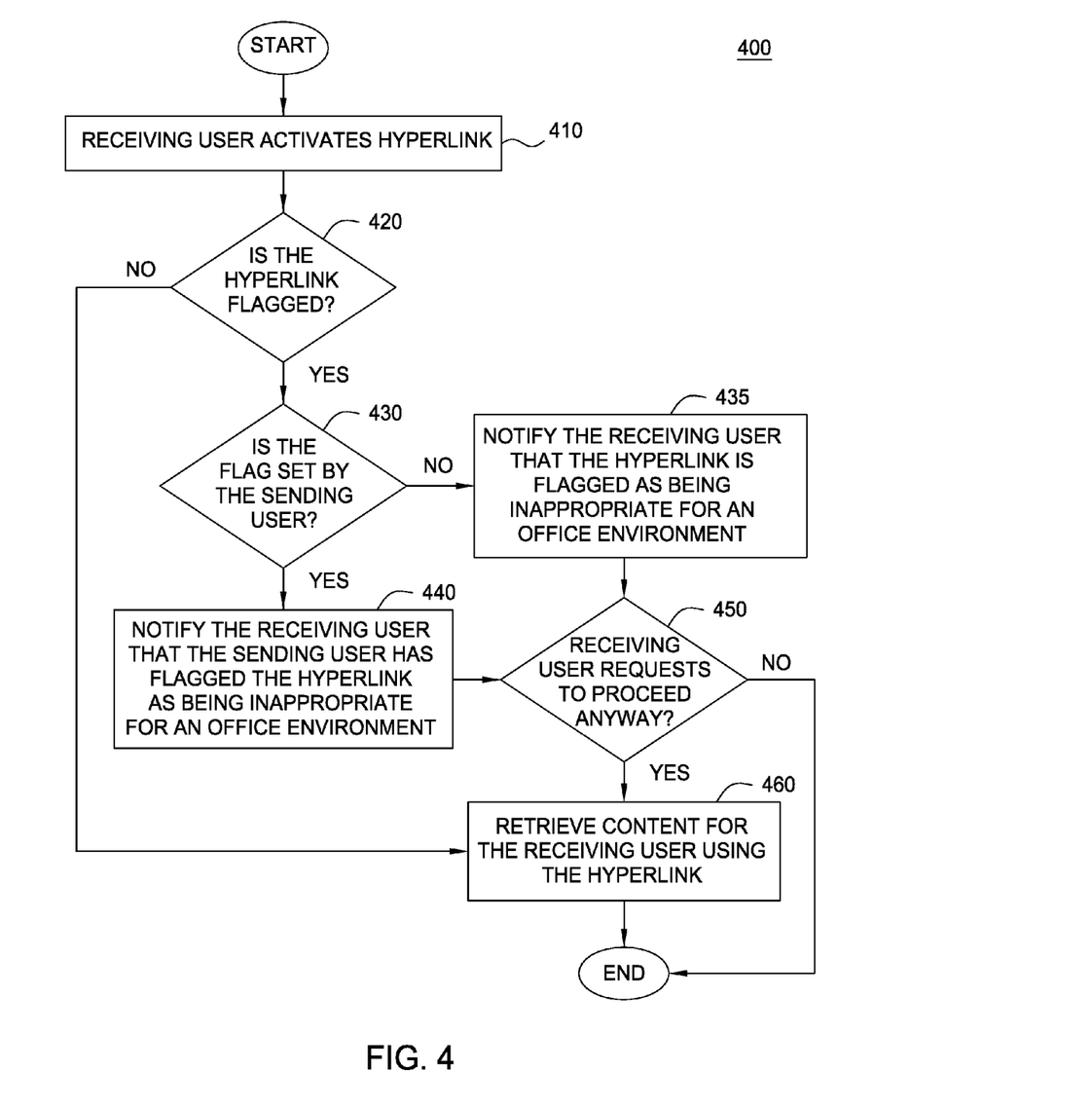
FIG. 4 is a flowchart depicting a method for servicing a request to retrieve content using a hyperlink, according to one embodiment of the invention.

FIG. 4 is a flowchart depicting a method 400 for servicing a request to retrieve content using a hyperlink, according to one embodiment of the invention. As shown, the method 400 begins at step 410, where the receiving user activates a hyperlink in a message received from the sending user. At step 420, the mail client application for the receiving user determines whether the hyperlink is flagged as being inappropriate, e.g., by parsing the MIME headers added by the sending mail user agent (or server). If the hyperlink does not include a MIME header marking the link (or content accessible through the link) as being inappropriate, the mail client application retrieves content for the receiving user using the hyperlink (step 460). For example, the mail client application may launch a web-browser to retrieve and render the content accessible through the link.

If the hyperlink is flagged, the receiving user may desire to know whether the flag is set by the sending user or by the application 150, according to one embodiment. The mail client application determines whether the flag is set by the sending user (step 430). If so, the mail client application notifies the receiving user that the hyperlink is flagged by the sending user as being inappropriate for an office environment (step 440). Otherwise, the mail client application notifies the receiving user that the hyperlink is flagged (i.e., by the application 150) as being inappropriate for an office environment (step 435). After the steps 435 or 440, the mail client application prompts the receiving user to specify whether to retrieve content using the hyperlink, despite the flag (step 450). If the receiving user responds affirmatively, the mail client application retrieves content for the receiving user using the hyperlink (step 460), after which the method 400 terminates. Otherwise, the method 400 also terminates.

Advantageously, embodiments of the invention provide techniques for flagging a hyperlink in a message as being inappropriate for an given user-environment, such as an office space or an educational setting. One embodiment of the invention provides a mail server application. In one embodiment, the mail-server application receives an email from a message sender addressed to a message recipient. Part of the message content may include one or more hyperlinks, such as web-page URIs. The mail server application may analyze the hyperlink and/or content retrieved using the hyperlink to determine whether the hyperlink is appropriate for the office environment. Alternatively, the mail client used by the sending user may be configured to analyze the hyperlink. In either case, if the mail server (or mail client) application deems the link (or the content accessible through the hyperlink) to be inappropriate, the application may flag the hyperlink as being inappropriate. For example, the mail server application may add MIME headers to an email message, marking the hyperlink as having been deemed inappropriate. The mail server application may also notify the sending user that the hyperlink is flagged as being inappropriate. If a hyperlink is flagged, a mail client application may notify the receiving user that the hyperlink has been flagged as being inappropriate for the given user environment. Consequently, both the sending user and the receiving user may be notified of any hyperlink determined to be inappropriate for an office environment. Accordingly, the sending user may learn to not send links of similar nature (and/or from the same website) to the receiving user in the given user environment. The receiving user may refrain from activating any hyperlink determined to be inappropriate for the given user environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions While the foregoing is directed to embodiments of the present invention, other and further embodiments of the invention may be devised without departing from the basic scope thereof, and the scope thereof is determined by the claims that follow.

What is claimed is:

1. A computer-implemented method to notify a sender and a recipient that a message from the sender to the recipient references content inappropriate for a current user environment of the recipient, the method comprising configuring one or more computer processors to perform an operation comprising:

receiving, from the sender, one or more messages addressed to the recipient and having a set of properties and a plurality of distinct hyperlinks including a first hyperlink, a second hyperlink, and a third hyperlink, wherein the one or more messages include the message;
retrieving the content referenced by the first hyperlink;
analyzing the retrieved content to determine whether the first hyperlink is appropriate for the current user environment of the recipient; and
upon determining, by operation of the one or more computer processors, that the content referenced by the first hyperlink is inappropriate for the current user environment of the recipient, notifying the sender and the recipient that the content referenced by the first hyperlink is programmatically flagged as referencing content inappropriate for the current user environment of the recipient, wherein the one or more messages are output for display to the recipient;

wherein the third hyperlink is determined to reference content appropriate for the current user environment of the recipient, wherein no indication is received from the sender that the content referenced by the third hyperlink is inappropriate for any user environment of the recipient, wherein the set of properties is configured to store an indication that the first hyperlink is programmatically flagged as referencing inappropriate content, an indication that the second hyperlink is manually flagged as referencing inappropriate content, and an indication that the third hyperlink is not flagged as referencing inappropriate content.

2. The computer-implemented method of claim 1, wherein the determining step is performed by at least one of a mail user agent (MUA), a mail transfer agent (MTA), and a mail delivery agent (MDA).

3. The computer-implemented method of claim 2, wherein the recipient is notified that the content referenced by the first hyperlink is programmatically flagged as referencing content inappropriate for the current user environment of the recipient, further upon receiving, from the recipient, user input activating the first hyperlink.

4. The computer-implemented method of claim 3, wherein the operation further comprises:
  determining whether the recipient is accessing the one or more messages in a user environment in which the content is inappropriate;
  wherein the recipient is notified that the first hyperlink is inappropriate only upon determining that the recipient is in the user environment in which the content is inappropriate.

5. The computer-implemented method of claim 4, wherein the operation further comprises comprising:
  receiving input from the recipient specifying to disregard any indication of a hyperlink referencing content inappropriate for a specified user environment;
  receiving, from the recipient, user input activating the first hyperlink; and
  upon determining that the current user environment of the recipient matches the specified user environment, outputting the content for display to the recipient, without notifying the recipient that the content referenced by the first hyperlink is inappropriate for the current user environment of the recipient;
  wherein the recipient is notified that the content referenced by the first hyperlink is programmatically flagged as referencing content inappropriate for the current user environment of the recipient, further upon determining that the current user environment of the recipient does not match the specified user environment.

6. The computer-implemented method of claim 5, wherein determining that the first hyperlink is inappropriate for the current user environment comprises:
  computing a sensitivity score based on the analyzed content and further based on a predefined dictionary of offensive terms; and
  determining that the computed sensitivity score exceeds a predefined inappropriateness threshold.

7. The computer-implemented method of claim 6, wherein the operation further comprises:
  setting a predefined property of the set of properties of the one or more messages to indicate that the content referenced by the first hyperlink is inappropriate for the current user environment of the recipient, wherein the predefined property is stored in a Multipurpose Internet Mail Extensions (MIME) message header.

8. A computer-readable storage device containing a program, which, when executed, performs an operation to notify a sender and a recipient that a message from the sender to the recipient references content inappropriate for a current user environment of the recipient, wherein the operation comprises:
  receiving, from the sender, one or more messages addressed to the recipient and having a set of properties and a plurality of distinct hyperlinks including a first hyperlink, a second hyperlink, and a third hyperlink, wherein the one or more messages include the message;
  retrieving the content referenced by the first hyperlink;
  analyzing the retrieved content to determine whether the first hyperlink is appropriate for the current user environment of the recipient; and
  upon determining, by operation of one or more computer processors when executing the program, that the content referenced by the first hyperlink is inappropriate for the current user environment of the recipient, notifying the sender and the recipient that the content referenced by the first hyperlink is programmatically flagged as referencing content inappropriate for the current user environment of the recipient, wherein the one or more messages are output for display to the recipient;
  wherein the third hyperlink is determined to reference content appropriate for the current user environment of the recipient, wherein no indication is received from the sender that the content referenced by the third hyperlink is inappropriate for any user environment of the recipient, wherein the set of properties is configured to store an indication that the first hyperlink is programmatically flagged as referencing inappropriate content, an indication that the second hyperlink is manually flagged as referencing inappropriate content, and an indication that the third hyperlink is not flagged as referencing inappropriate content.

9. The computer-readable storage device of claim 8, wherein the determining step is performed by at least one of a mail user agent (MUA), a mail transfer agent (MTA), and a mail delivery agent (MDA).

10. The computer-readable storage device of claim 9, wherein the recipient is notified that the content referenced by the first hyperlink is programmatically flagged as referencing content inappropriate for the current user environment of the recipient, further upon receiving, from the recipient, user input activating the first hyperlink.

11. The computer-readable storage device of claim 10, wherein the operation further comprises:
  determining whether the recipient is accessing the one or more messages in a user environment in which the content is inappropriate;
  wherein the recipient is notified that the first hyperlink is inappropriate only upon determining that the recipient is in the user environment in which the content is inappropriate.

12. The computer-readable storage device of claim 11, wherein the operation further comprises:
  receiving input from the recipient specifying to disregard any indication of hyperlink referencing content inappropriate for a specified user environment;
  receiving, from the recipient, user input activating the first hyperlink; and
  upon determining that the current user environment of the recipient matches the specified user environment, outputting the content for display to the recipient, without notifying the recipient that the content referenced by the first hyperlink is inappropriate for the current user environment of the recipient;

wherein the recipient is notified that the content referenced by the first hyperlink is programmatically flagged as referencing content inappropriate for the current user environment of the recipient, further upon determining that the current user environment of the recipient does not match the specified user environment.

13. The computer-readable storage device of claim 12, wherein determining that the first hyperlink is inappropriate for the current user environment comprises:

computing a sensitivity score based on the analyzed content and further based on a predefined dictionary of offensive terms; and determining that the computed sensitivity score exceeds a predefined inappropriateness threshold.

14. The computer-readable storage device of claim 13, wherein the operation further comprises:

setting a predefined property of the set of properties of the one or more messages to indicate that the content referenced by the first hyperlink is inappropriate for the current user environment of the recipient, wherein the predefined is stored in a Multipurpose Internet Mail Extensions (MIME) message header.

15. A system to notify a sender and a recipient that a message from the sender to the recipient references content inappropriate for a current user environment of the recipient, the system comprising:

one or more computer processors; and a memory containing a program, which when executed by the one or more computer processors is configured to perform an operation comprising:

receiving, from the sender, one or more messages addressed to the recipient and having a set of properties and a plurality of distinct hyperlinks including a first hyperlink, a second hyperlink, and a third hyperlink, wherein the one or more messages include the message;

retrieving the content referenced by the first hyperlink;

analyzing the retrieved content to determine whether the first hyperlink is appropriate for the current user environment of the recipient; and upon determining that the content referenced by the first hyperlink is inappropriate for the current user environment of the recipient, notifying the sender and the recipient that the content referenced by the first hyperlink is programmatically flagged as referencing content inappropriate for the current user environment of the recipient, wherein the one or more messages are output for display to the recipient;

wherein the third hyperlink is determined to reference content appropriate for the current user environment of the recipient, wherein no indication is received from the sender that the content referenced by the third hyperlink is inappropriate for any user environment of the recipient, wherein the set of properties is configured to store an indication that the first hyperlink is programmatically flagged as referencing inappropriate content, an indication that the second hyperlink is manually flagged as referencing inappropriate content, and an indication that the third hyperlink is not flagged as referencing inappropriate content.

16. The system of claim 15, wherein the determining step is performed by at least one of a mail user agent (MUA), a mail transfer agent (MTA), and a mail delivery agent (MDA).

17. The system of claim 16, wherein the recipient is notified that the content referenced by the first hyperlink is programmatically flagged as referencing content inappropriate for the current user environment of the recipient, further upon receiving, from the recipient, user input activating the first.

18. The system of claim 17, wherein the operation further comprises:

determining whether the recipient is accessing the one or more messages in a user environment in which the content is inappropriate;

wherein the recipient is notified that the first hyperlink is inappropriate only upon determining that the recipient is in the user environment in which the content is inappropriate.

19. The system of claim 18, wherein the operation further comprises:

receiving input from the recipient specifying to disregard any indication of hyperlink referencing content inappropriate for a specified user environment;

receiving, from the recipient, user input activating the first hyperlink; and upon determining that the current user environment of the recipient matches the specified user environment, outputting the content for display to the recipient, without notifying the recipient that the content referenced by the first hyperlink is inappropriate for the current user environment of the recipient;

wherein the recipient is notified that the content referenced by the first hyperlink is programmatically flagged as referencing content inappropriate for the current user environment of the recipient, further upon determining that the current user environment of the recipient does not match the specified user environment.

20. The system of claim 19, wherein determining that the first hyperlink is inappropriate for the current user environment comprises:

computing a sensitivity score based on the analyzed content and further based on a predefined dictionary of offensive terms; and determining that the computed sensitivity score exceeds a predefined inappropriateness threshold.

21. The system of claim 20, wherein the operation further comprises:

setting a predefined property of the set of properties of the one or more messages to indicate that the content referenced by the first hyperlink is inappropriate for the current user environment of the recipient, wherein the predefined property is stored in a Multipurpose Internet Mail Extensions (MIME) message header.

22. The system of claim 21, wherein no indication is received from the sender that the content referenced by the first hyperlink is inappropriate for any user environment of the recipient, wherein the current user environment is specified by at least one of the MUA, the MTA, and the MDA, wherein an indication is received from the sender, the indication specifying that content referenced by the second hyperlink is inappropriate for any user environment of the recipient.

23. The system of claim 22, wherein the recipient is notified that the content referenced by the second hyperlink is manually flagged by the sender as referencing content inappropriate for any user environment of the recipient, upon receiving, from the recipient, user input activating the second hyperlink, and wherein the content referenced by the second hyperlink is not analyzed to determine whether the second hyperlink is inappropriate for the current user environment of the recipient;

wherein the content referenced by the first hyperlink and the content referenced by the second hyperlink are output for display to the user, responsive to receiving requests from the user to override any inappropriateness flag of the first hyperlink and the second hyperlink, respectively.

24. The system of claim 23, wherein the set of properties of the one or more messages stores, for the first hyperlink, the second hyperlink, and the third hyperlink, respectively, a unique identifier for the respective hyperlink.

* * * * *